Figure 1:
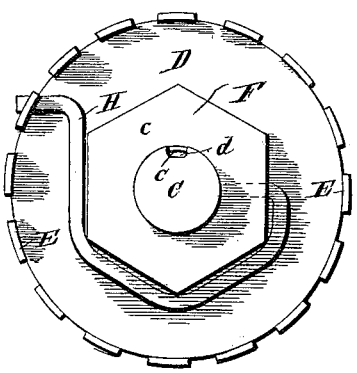

(No Model.)

F. W. HARMON.
NUT LOCK.

No. 362,832. Patented May 10, 1887.

Witnesses
Geo. Thorpe
E. G. Siggers

Inventor
Frank W. Harmon
By his Attorneys,
C. A. Knowles

N. PETERS, Photo-Lithographer, Washington, D. C.

UNITED STATES PATENT OFFICE.

FRANK W. HARMON, OF MANCHESTER CENTRE, NEW YORK.

NUT-LOCK.

SPECIFICATION forming part of Letters Patent No. 362,832, dated May 10, 1887.

Application filed March 21, 1887. Serial No. 231,733. (No model.)

*To all whom it may concern:*

Be it known that I, FRANK W. HARMON, a citizen of the United States, residing at Manchester Centre, in the county of Ontario and State of New York, have invented new and useful Improvements in Nut-Locks, of which the following is a specification.

The invention relates to improvements in nut-locks, the object being to provide a safe and reliable lock of simple and cheap construction that will give somewhat when jarred by the vibrations of the surrounding parts, and thus avoid the liability of breakage; and it consists in the construction and arrangement of a locking spring rod and the combination of the same with adjacent parts, as hereinafter described, illustrated in the drawings, and pointed out in the claims hereto appended.

Figure 2:
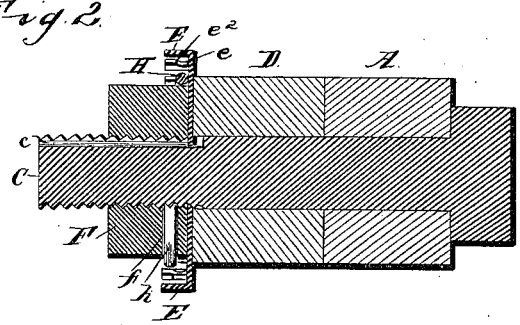
Figure 3:
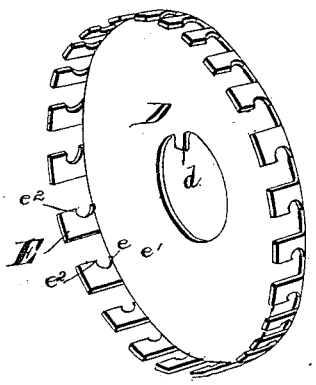
Figure 4:
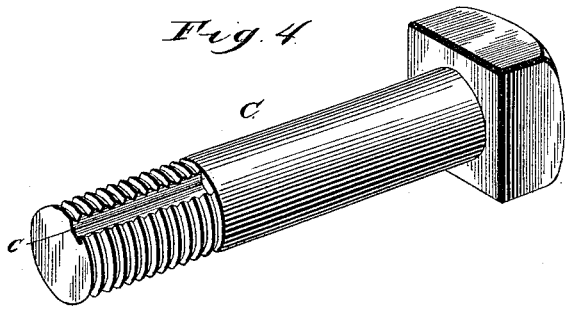
Figure 5:
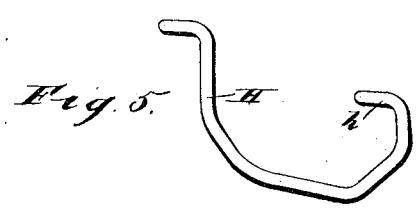

In the accompanying drawings, Figure 1 is a plan view of the improved nut-lock. Fig. 2 is a central longitudinal section of the same. Fig. 3 is a perspective view of the toothed washer detached. Fig. 4 is a perspective view of the bolt detached. Fig. 5 is a perspective view of the spring-rod.

Referring to the drawings, A and B, respectively, designate two bars to be secured together by a bolt—such as a rail and a fish-plate.

C is a bolt passing through suitable openings in the said rail and fish-plate, and having its head resting against the inner surface of the former; and $c$ is a longitudinal groove in the bolt, extending through its threaded portion.

D is a washer provided with a central opening, to fit upon the bolt and lie upon the outer surface of the fish-plate, and a tongue, $d$, to enter the groove $c$ in the bolt, so that the washer must turn with the latter. The washer is provided around its circumferential edge with the teeth E, standing at right angles outward from its disk $e'$, and having the notches $e\ e$ on their corresponding edges. The said notches are a little more than semicircular, and have their inner and outer ends inclined toward the disk $e'$, the outer end forming a retaining point or hook, $e^2$.

F is an angular nut, which screws down on the bolt till it impinges on the washer, and is provided in one of its sides with a recess or opening, $f$.

H is a spring-rod or thick wire, having one end, $h$, inserted in the recess or opening $f$, and which is bent thence a little more than half-way around the nut F, and has its outer end bent radially outward and engaged in the notch $e$ of one of the teeth E, the point or hook $e^2$ preventing its easy or accidental disengagement as it springs against the outer edge of the notch, which is farther inward than the opening or recess $f$ in the nut, in which its inner end is engaged, as described.

The tongue $d$ prevents the washer from turning on the bolt, and the spring-rod H locks the nut to the washer, so that the said nut cannot unscrew from the bolt. The said rod, however, allows the nut to turn slightly in either direction when jarred; but immediately thereafter returns it to its normal position.

I do not desire to limit the use of my invention to railways only, as it is adapted for use in all places where the nut is liable to become accidentally unscrewed.

Having described my invention, I claim—

1. In a nut-lock, the combination of the bolt having the longitudinal groove extending along its tapped end, the washer fitting upon said bolt, provided with a tongue to enter the groove in the bolt, and having in its circumferential edge the teeth standing out at right angles to its disk, and provided with notches a little more than semicircular upon their corresponding edges, the nut provided with an opening or recess in one of its sides, and the spring-rod with one end inserted into said recess or opening and the other engaged in a notch of one of the teeth, which notch is farther inward than the recess or opening in the nut, substantially as specified.

2. The herein-described nut-lock, consisting of the washer D, provided with the teeth E, having the notches $e$, forming the points $e^2$, the nut F, having the opening or recess $f$, and the spring-rod H, all constructed and arranged substantially as and for the purpose specified.

In testimony that I claim the foregoing as my own I have hereto affixed my signature in presence of two witnesses.

FRANK W. HARMON.

Witnesses:
C. L. BRYANT,
E. D. MATHER.